United States Patent
Cooke et al.

(10) Patent No.: US 8,196,393 B2
(45) Date of Patent: Jun. 12, 2012

(54) INJECTION DEVICE FOR REAGENT

(75) Inventors: Michael Peter Cooke, Gillingham (GB); Louise A Connelly, Rainham (GB)

(73) Assignee: Delphi Technologies Holding S.arl, Troy, MI (US)

(*) Notice: Subject to any disclaimer, the term of this patent is extended or adjusted under 35 U.S.C. 154(b) by 1013 days.

(21) Appl. No.: 12/217,368

(22) Filed: Jul. 3, 2008

(65) Prior Publication Data

US 2009/0013671 A1     Jan. 15, 2009

(30) Foreign Application Priority Data

Jul. 9, 2007 (EP) ................................. 07252736

(51) Int. Cl.
*F01N 3/08* (2006.01)

(52) U.S. Cl. .................................................. 60/295

(58) Field of Classification Search .............. 60/286, 60/301; 239/533.7, 533.9, 585.1, 585.5; 137/541, 540
See application file for complete search history.

(56) References Cited

U.S. PATENT DOCUMENTS

| 4,817,873 A | 4/1989 | McKay |
| 2007/0045451 A1 | 3/2007 | Nishiwaki |

FOREIGN PATENT DOCUMENTS

| DE | 34 10 476 | 2/1985 |
| DE | 199 27 898 | 12/2000 |
| DE | 101 03 933 | 8/2002 |
| DE | 10 2005 022 562 | 12/2005 |
| DE | 10 2004 050022 | 4/2006 |
| EP | 1 561 919 | 8/2005 |
| GB | 288 600 | 4/1929 |
| GB | 2 073 315 | 10/1981 |
| JP | 51-127924 | 11/1976 |
| JP | 62-284958 | 12/1987 |
| JP | 4-42267 | 4/1992 |
| JP | 8-296529 | 11/1996 |
| JP | 9-96212 | 4/1997 |
| JP | 9-310660 | 12/1997 |
| JP | 10-47206 | 2/1998 |

(Continued)

OTHER PUBLICATIONS

European Search Report dated Dec. 19, 2007.

(Continued)

*Primary Examiner* — Thomas Denion
*Assistant Examiner* — Jonathan Matthias
(74) *Attorney, Agent, or Firm* — Thomas N. Twomey

(57) ABSTRACT

An injection device for administering a reagent into an exhaust chamber of an internal combustion engine, comprising a device inlet and a device outlet and a sub-assembly held securely within a device housing. The sub-assembly comprises (i) valve housing defining a valve seat, (ii) valve means movable outwardly from the valve housing, away from the valve seat, to permit the reagent to be delivered into the exhaust chamber through the device outlet, whereby a force is applied to the valve means due to reagent delivered to the device inlet which serves to urge the valve means away from the valve seat, and (iii) bias means for applying a biasing force to the valve means which serves to urge the valve means against the valve seat so as to prevent delivery of the reagent through the device outlet into the exhaust chamber. The device housing is a separate part from the valve housing and has a housing bore within which the valve housing is held securely so as to hold the sub-assembly securely within the device housing.

12 Claims, 3 Drawing Sheets

FOREIGN PATENT DOCUMENTS

| | | |
|---|---|---|
| JP | 2000-291429 | 10/2000 |
| JP | 2002-525491 | 8/2002 |
| JP | 2002-539362 | 11/2002 |
| JP | 2007-100672 | 4/2007 |

OTHER PUBLICATIONS

Japan Office Action dated Aug. 10, 2010.
European Communication dated Oct. 19, 2009.

INJECTION DEVICE FOR REAGENT

TECHNICAL FIELD

The present invention relates to an injection device suitable for administering a reagent into an exhaust chamber or passage of an internal combustion engine, for example to reduce emissions of harmful substances to the atmosphere.

BACKGROUND TO THE INVENTION

Catalytic cleaning processes can be used to partially or completely remove pollutants from the exhaust gas of an internal combustion engine. Specifically, exhaust gas cleaning may be achieved using a reducing agent that reduces one or more pollutants, for example, NOx, in the exhaust gas.

In order to reduce exhaust gas emissions from an internal combustion engine, the reducing agent (e.g. urea solution) can be sprayed into an exhaust passage using an injection device, as shown, for example, in WO2004111401. Typically, the activity of the reducing agent is triggered on contact with a catalyst downstream from the point of injection. The injection device is mounted to the passage of an exhaust system and is exposed to the hot gases passing through the system.

The general operation of a reagent dosing system is described with reference to FIG. 1. A diesel engine 1 produces an exhaust flow comprising various exhaust gases 3. The exhaust gases are conveyed through an exhaust system, indicated generally at 5, comprising an oxidation catalyst device 7, a selective reduction catalyst (SCR) device 9 and a slip catalyst 11.

The oxidation catalyst device 7 is a flow through device that consists of a canister containing a honeycomb-like structure or substrate. The substrate has a large surface area that is coated with an active catalyst layer. This layer contains a small, well dispersed amount of precious metals such as platinum or palladium. As the exhaust gases traverse the catalyst, carbon monoxide, gaseous hydrocarbons and liquid hydrocarbon particles (unburned fuel and oil) are oxidized, thereby reducing harmful emissions.

The SCR device 9 performs Selective Catalytic Reduction (SCR) of nitrogen oxide (NOx) using ammonia (derived from a source of urea) as a chemical reductant. The slip catalyst 11 is located downstream of the SCR device 9 to clean up any unreacted ammonia.

Urea for the SCR device 9 is stored in a tank 13 which is in fluid communication with the exhaust system 5. A pump 15 is provided to pump urea from the tank 13 to the exhaust system 5. The supply of urea is controlled by a control unit 17, for example the engine control unit, which receives engine speed and other engine parameters from the engine 1. An injection device 19 is used to inject the urea into the exhaust flow.

It is an object of the invention to provide an injection device which is convenient to manufacture and which is suitable for use in a reagent dosing system generally of the aforementioned type.

SUMMARY OF THE INVENTION

According to a first aspect of the present invention, there is provided an injection device for administering a reagent into an exhaust chamber of an internal combustion engine, the injection device comprising a device inlet, a device outlet, a device housing and a sub-assembly of additional parts which can be pre-assembled before installation within the device housing. The sub-assembly comprises (i) a valve housing defining a valve seat, (ii) valve means movable outwardly from the valve housing, away from the valve seat, to allow the reagent to be delivered into the exhaust chamber through the device outlet, whereby a force is applied to the valve means due to reagent delivered to the device inlet which serves to urge the valve means away from the valve seat, and (iii) bias means for applying a biasing force to the valve means which serves to urge the valve means against the valve seat so as to prevent delivery of the reagent through the device outlet into the exhaust chamber. The device housing is separate from the valve housing and has a housing bore within which the valve housing is held securely so as to hold the sub-assembly securely within the device housing. It is only due to the contact between the valve housing and the device housing that the sub-assembly is held within the device housing: there are no other points of connection between the sub-assembly and the device housing.

The construction of the injection device is such that it can be assembled conveniently by first assembling the sub-assembly of parts and then inserting the sub-assembly into the device housing.

In one embodiment, the valve housing is held securely within device housing bore by means of an interference fit. This is particularly advantageous as the interference fit does not require the provision of additional features to hold the parts together, such as screw threads and/or collets.

Furthermore, the valve housing may be held securely within the device housing bore by means of a glue, which may be applied as an alternative, or in addition, to the interference fit.

The securing of the valve housing within the device housing is conveniently achieved by press-fitting the valve housing into the device housing.

The valve means may include a guide region which forms a clearance fit within the valve housing and serves to guide movement of the valve means, in use. Typically, the guide region is a cylindrical region of the valve means. Guiding movement of the valve means provides the benefit that, when the valve means is moved away from the valve seat to commence injection, a uniform spray of reagent is delivered through the device outlet. Preferably the injection device in a reagent dosing system provides a substantially uniform spray of reducing agent into the exhaust chamber.

In one embodiment, the valve means comprises stop means for limiting the extent of movement of the valve means outwardly from the valve housing. For example, the valve means may include a valve member and a stop member which is held securely together with, or forms an integral part of, the valve member. The stop member serves to limit the extent of movement of the valve member outwardly from the valve housing.

The stop member may define a first surface and the valve housing may define a second surface, the first and second surfaces together defining a clearance gap which sets the limit of the extent of outward movement of the valve member from the valve housing. When the sub-assembly is constructed, the valve member and the stop member are assembled so that the surfaces are spaced apart by an amount which provides the required maximum lift of the valve member, in use.

In the embodiment in which the stop member forms an integral part of the valve member it will be appreciated that it is that region of the valve member acting as the stop member which defines the first surface.

For ease of assembly purposes, however, and so as to provide a convenient means of adjusting the maximum lift of the valve means, it is particularly convenient for a stop member component to be held together with the valve member in an interference fit.

By way of example, at least one of the stop member and the valve housing is shaped to define a flow path for reagent between the device inlet and the valve housing when the valve means is at full lift (i.e. the first and second surfaces are engaged).

The sub-assembly may further comprise a sleeve within which at least a portion of the stop member is received, preferably in an interference fit. Conveniently, the bias means includes a spring component within which at least a portion of the stop member is received. For example, a first end of the spring component abuts a surface of the valve housing and a second end of the spring component abuts a surface of the sleeve so that the extent to which the stop member is received within the sleeve, as the sub-assembly is being assembled, sets the biasing force. By varying the extent to which the stop member is received within the sleeve, for example, the biasing force of the spring can be varied, thereby setting the opening point (opening pressure) of the injection device.

It is also desirable that the reducing agent remains sufficiently cool in the injection device so that: (i) it does not crystallise or decompose in the injection device; and (ii) downstream of the injection point the emission reduction reaction takes place with high efficacy, thereby reducing exhaust emissions. The device housing may therefore include insulating means to limit heat transfer to the injection device due to exhaust gas in the exhaust chamber. For example, the device housing may define, at least in part, a cavity which, preferably, is evacuated.

The device housing may comprise an inner housing part and an outer housing part which together define the cavity, the sub-assembly being held securely (e.g. by means of an interference fit) within the inner housing part.

It is convenient for the outer housing part to form an outer sleeve of the device.

According to a second aspect of the invention, an injection device for administering a reagent into an exhaust chamber of an internal combustion engine comprises; a device inlet and a device outlet, a valve housing defining a valve seat, and a valve member movable outwardly from the valve housing, away from the valve seat, to permit the reagent to be delivered into the exhaust chamber through the device outlet, whereby a force is applied to the valve member due to reagent delivered to the device inlet which serves to urge the valve member away from the valve seat. A bias means applies a biasing force to the valve member which serves to urge the valve member against the valve seat so as to prevent delivery of the reagent through the device outlet into the exhaust chamber. A stop member limits the extent of movement of the valve member outwardly from the valve housing, wherein the valve member includes a projection which is held securely within the stop member so that the valve member and the stop member move together as a single part.

Preferably, the projection forms an interference fit within the stop member, or vice versa.

The nature of the interference fit between the stop member and the valve member provides a convenient means of manufacturing the injection device as the parts can be press fitted together, for example, without the requirement for additional attachment parts.

According to a third aspect of the invention, an injection device for administering a reagent into an exhaust chamber of an internal combustion engine comprises a device inlet and a device outlet, a valve housing defining a valve seat, and a valve member movable outwardly from the valve housing, away from the valve seat, to permit the reagent to be delivered into the exhaust chamber through the device outlet, whereby a force is applied to the valve member due to reagent delivered to the device inlet which serves to urge the valve member away from the valve seat. A bias means applies a biasing force to the valve member which serves to urge the valve member against the valve seat so as to prevent delivery of the reagent through the device outlet into the exhaust chamber. A stop member limits the extent of movement of the valve member outwardly from the valve housing. A sleeve is provided, within which the stop member is held securely, so that the sleeve and the stop member move together as a single part.

Preferably, the stop member is received within the sleeve in an interference fit.

In one embodiment of the third aspect of the invention, the stop member may be formed integrally with the valve member.

It is to be appreciated that any reference to a bore in a housing part is not intended to be limited to housing which has been machined through boring, but is intended to include any form of formation or drilling in the housing which is capable of receiving another part.

BRIEF DESCRIPTION OF THE DRAWINGS

The background to the invention has already been described with reference to FIG. 1 which is a schematic view of a reagent dosing system for an internal combustion engine.

The invention has will now be described, by way of example only, with reference to the following Figures in which.

DETAILED DESCRIPTION OF THE DRAWINGS

Figure 1:
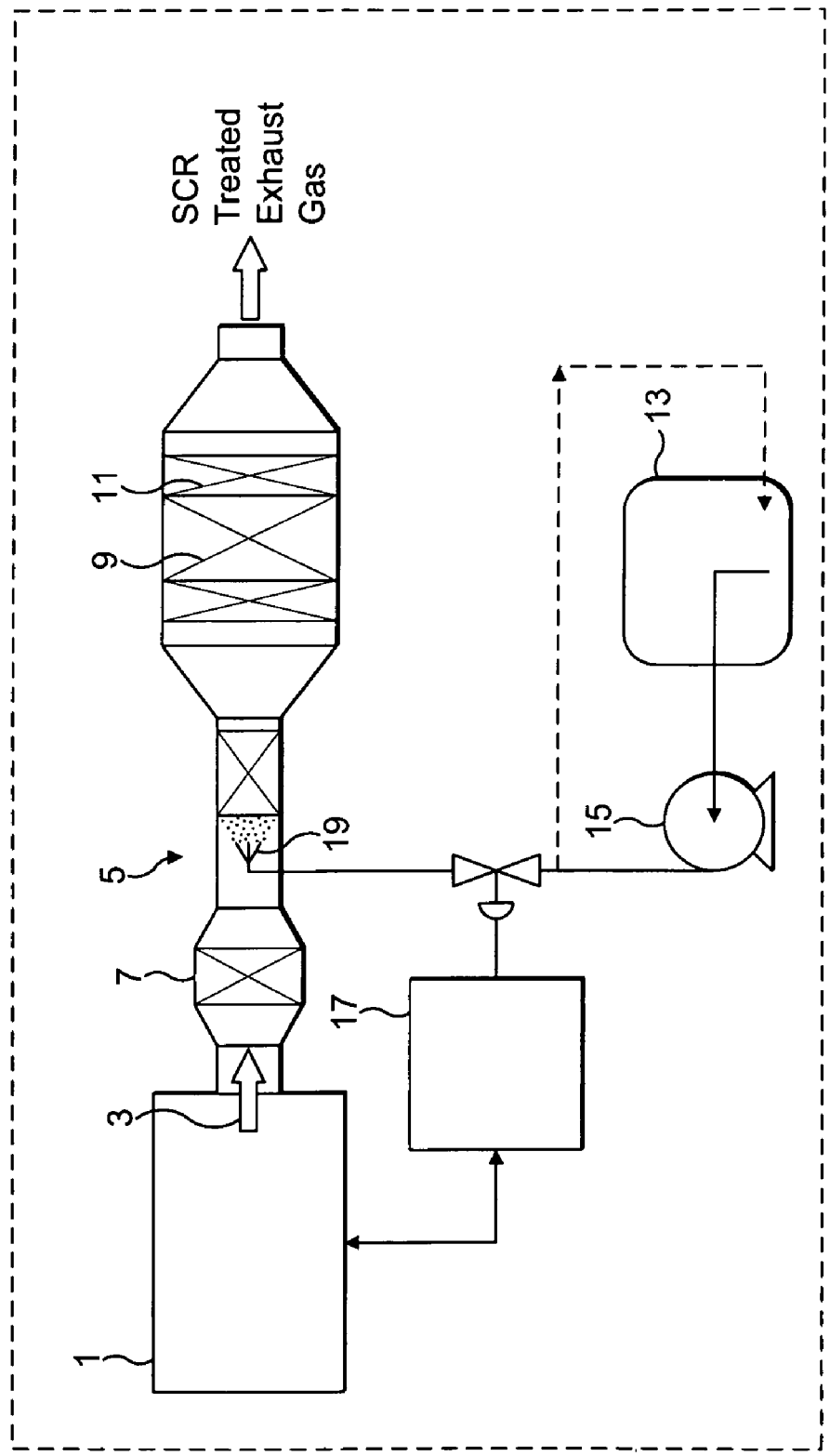
Figure 2:
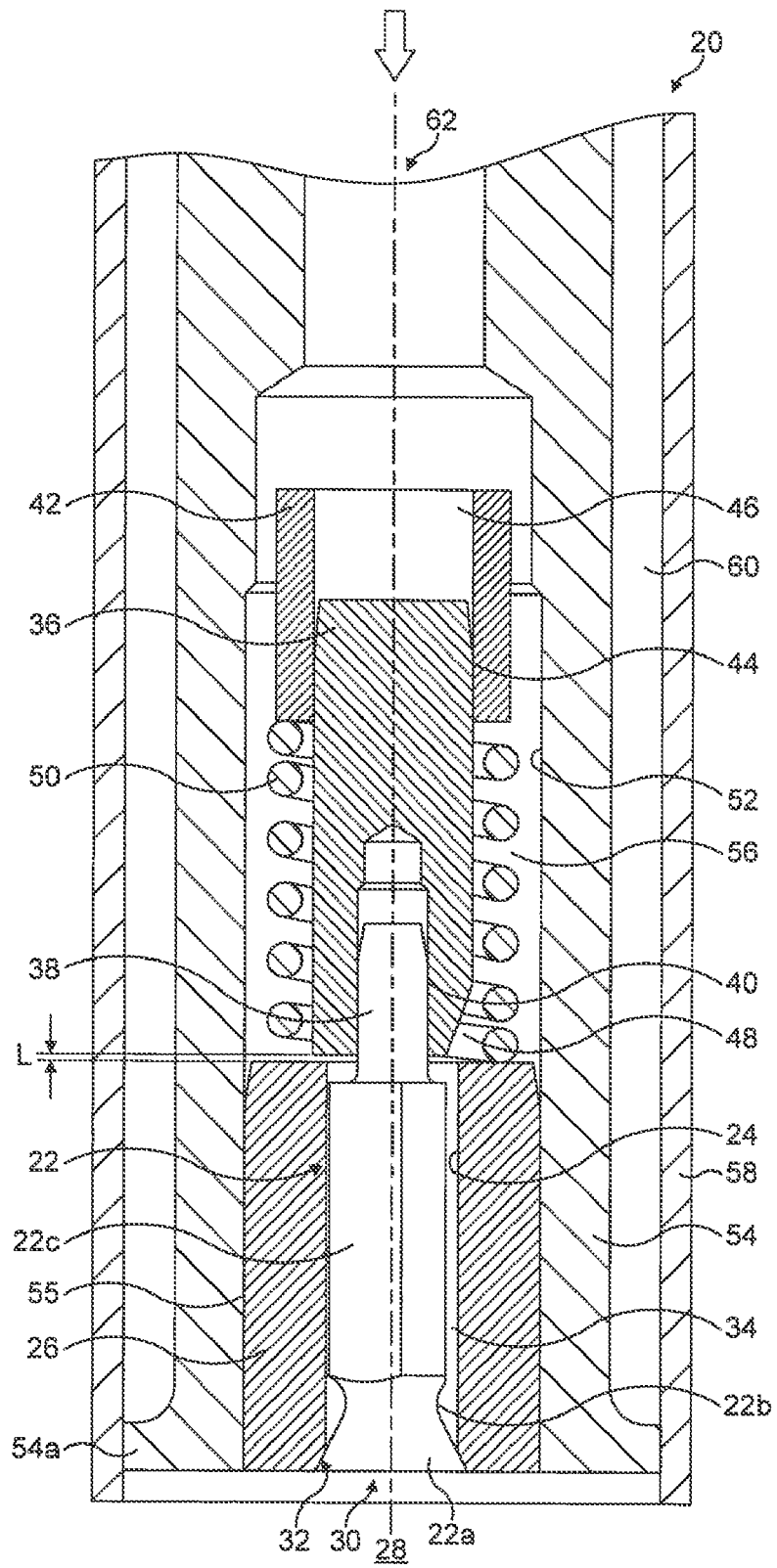
FIG. 2 is a cross-sectional view of an injection device according to a first embodiment of the invention when in a closed position in which no reagent is injected.

Referring to FIG. 2, the injection device 20 of the invention may be used to replace the injection device 19 in a reagent dosing system of the type generally shown in FIG. 1. The injection device comprises valve means including a valve member 22 which is slidable within a bore 24 provided in a valve seat housing 26 to deliver a metered flow of reagent fluid into an exhaust chamber or passage 28 of the engine through an outlet 30 of the device. The valve member 22 includes a main body 22c of cylindrical form which terminates, at a lower end adjacent to the device outlet 30, in a frusto conical region 22a. The frusto conical region 22a of the valve member 22 is separated from the cylindrical region 22c via a neck region 22b. The cylindrical region 22c acts as a guide region for the valve member 22 (i.e. only a slight clearance exists between the cylindrical region 22c and the bore 24) as it moves within the bore 24, in use.

The frusto conical region 22a of the valve member 22 is engageable with a valve seat 32 defined by the bore 24 so that, when the valve member 22 is seated, the delivery of reagent through the device outlet 30 is prevented. When the valve member 22 is unseated, the delivery of reagent through the device outlet 30 is permitted. The unseat the valve member 22, it is moved outwardly from the bore 24, away from the valve seat 32, so that it projects part way into the exhaust chamber 28. The cylindrical body of the valve member 22 is provided with flats, slots or grooves along its axis (only one of which is identified at 34) to permit a flow of reagent past the valve member 22 towards the device outlet 30.

The valve means is further provided with stop means in the form of a stop member 36 which serves to limit the maximum extent of opening of the valve means. At the end of the valve member 22 remote from the device outlet 30, a valve peg or projection 38 extends into a bore or drilling provided in the stop member 36 in an interference fit 40 so that the valve member 22 and the stop member 36 are coupled together securely. The outer diameter of the stop member 36 is greater than that of the internal diameter of the bore 24 in the valve seat housing 26.

At its lower end, a surface of the stop member 36 defines, together with an upper surface of the valve seat housing 26, a clearance gap L. The clearance gap L defines the maximum extent of movement of the valve member 22 between its fully closed and fully open positions, as will be apparent from the following description. The lower end of the stop member 36 is also provided with a plurality of chamfers 48 (only one of which is visible in the section shown) to allow a flow of reagent past the stop member 36, in use. Alternative formations may be provided on the stop member 36, if preferred, to provide the flow path e.g. slots, flats or grooves. An upper end of the stop member 36 is received within a sleeve 42 in an interference fit 44. By virtue of the stop member 36 being received only partially within the sleeve 42 for ease of assembly purposes, an open-ended chamber 46 is formed within the sleeve 42 and by the upper surface of the stop member 36.

The device further includes a bias means in the form of a helical spring 50 within which the stop member 36 is received so that an upper end of the spring 50 engages with a lower end of the sleeve 42 whilst a lower end of the spring 50 is engaged with the upper surface of the valve seat housing 26. The position of the sleeve 42 relative to the stop member 36 is adjustable during assembly of the device 20, as described further below. The force due to the spring 50 urges the valve member 22 against the valve seat 32 in circumstances in which the pressure of reagent acting on the upper surface of the stop member 36, and hence on the valve member 22, is insufficient to force the valve member 22 outwardly from the valve seat housing 26 away from the valve seat 32.

The valve member 22, the valve seat housing 26, the stop member 36, the spring 50 and the sleeve 42 are received within the bore 52 of a generally tubular housing part 54, the bore 52 defining a chamber 56 within which the spring 50 is housed. The chamber 56 forms a part of a flow path for reagent between a device inlet 62 and the valve housing 26. The valve seat housing 26 forms an interference fit 55 in the lower end of the bore 52. The housing part 54 includes a flared annular portion 54a at its lower end.

The housing part 54 is received within an outer sleeve 58 in the form of a heat shield so that the outer surface of the housing part 54 defines a cavity 60 together with the internal surface of the sleeve 58. The cavity 60 is evacuated so as to provide a thermal insulation means to protect the device from the heat of exhaust gases within the chamber 28. Together, the heat shield 58 and the housing part 54 define an outer device housing.

Operation of the device 20 so as to allow an injection of reagent into the exhaust passage 28 through the device outlet 30 will now be described.

A reagent (such as urea) is delivered from a pump (not shown) under the control of an engine control unit (not shown) to the device inlet 62. The pump and the control unit may take the arrangement and the form of those in the prior art scheme of FIG. 1. Reagent delivered to the device inlet 62 flows into the upper region of the bore 52 of the housing part 54 and into the chamber 46. Reagent is also able to flow through the chamber 56 for the spring and past the chamfer 48 on the stop member 36 into the valve seat housing 26. Although reagent is able to flow past the grooves 34 on the valve member 22, with the valve member 22 seated against the valve seat 32, as in FIG. 2, the reagent is not able to flow into the exhaust chamber 28.

If the pressure of reagent delivered to the device inlet 62 exceeds a predetermined level, the spring force which otherwise holds the valve member 22 against its seat 32 is overcome and the stop member 36, the valve member 22 and the sleeve 42, all being secured together, start to move in an outward direction from the valve housing bore 24. As the valve member 22 is moved away from the valve seat 32 into the exhaust passage 28, the device outlet 30 is opened. Reagent delivered to the device inlet 62 flows through the chamber 56 and past the chamfer 48 into the valve seat housing 26, where it flows past the valve member 22 by virtue of the grooves 34 and, thus, flows through the device outlet 30 past the open valve seat 32. As movement of the valve member 22 is guided by cooperation between the cylindrical region 22c and the bore 24, a uniform annulus is opened up as the valve member 22 moves away from the seat 32 and a substantially uniform spray of reagent is injected into the exhaust chamber 28.

Once the stop member 36 and the valve member 22 have moved together through a distance L, as defined by the clearance gap, a point will be reached at which the lower surface of the stop member 36 is brought into engagement with the upper surface of the valve seat housing 26 by virtue of the stop member 36 having an outer diameter which is greater than the internal diameter of the valve housing bore 24. This is the operating state of the device shown in FIG. 3. The point of engagement between the two surfaces 36, 26 sets the maximum extent of movement (lift) of the valve member 22 away from its seat 32. The flow of reagent into the valve seat housing 26 continues, even with the surfaces engaged, due to the presence of the chamfer 48 on the stop member 36 so that a continued delivery of reagent occurs into the exhaust passage 28 until such time as the device outlet 30 is closed.

In order to return the valve member 22 to its seated position to cease injection, the force acting on the stop member 36 due to reagent delivered through the device inlet 62 is reduced to a level at which the spring force is sufficient to cause the valve member 22 to retract within the valve housing bore 24 and seat against its seat 32, opening the clearance gap, L. Therefore, in order to close the device outlet 30, the supply of fluid to the device inlet 62 must be reduced, or halted altogether, under the control of the control unit.

The provision of a lift stop feature such as stop member 36 is beneficial as it allows the operating pressure of the nozzle to be varied, depending on how the reagent supply pump which feeds the device inlet 62 (e.g. pump 15 in FIG. 1) is driven. With the stop member 36 present, once the valve member 22 has moved away from the valve seat 32 to its maximum extent, driving the pump at twice the speed, for example, will give a four times increase in the pressure of reagent delivered to and from the device 20. Altering the pump speed therefore allows the spray atomisation and penetration to be adjusted so as to suit the particular engine running conditions (e.g. exhaust flow velocity). When exhaust velocity is low, for example, the requirement for good spray atomisation is reduced as the reagent has a relatively long time to evaporate before reaching the selective reduction catalyst (SCR) device (i.e. device 9 in FIG. 1). In such circumstances it is also beneficial to prevent over-penetration of the injected spray to prevent the spray hitting the walls of the exhaust chamber 28. If, on the other hand, the exhaust velocity is high, the exhaust flow is able to carry the injected reagent to the SCR device quickly, and so the droplets of reagent need to be small enough to evaporate quickly. Over-penetration is also less likely for higher exhaust flow velocities as the reagent gets swept away quickly by the fast-moving exhaust flow, so good spray penetration is preferred in this running condition.

In an alternative embodiment (not shown) to that described previously, the provision of a lift stop feature may be removed altogether if, for example, there is no requirement to be able to adjust the spray penetration and/or atomisation properties of the injected reagent in the manner described above.

Figure 3:
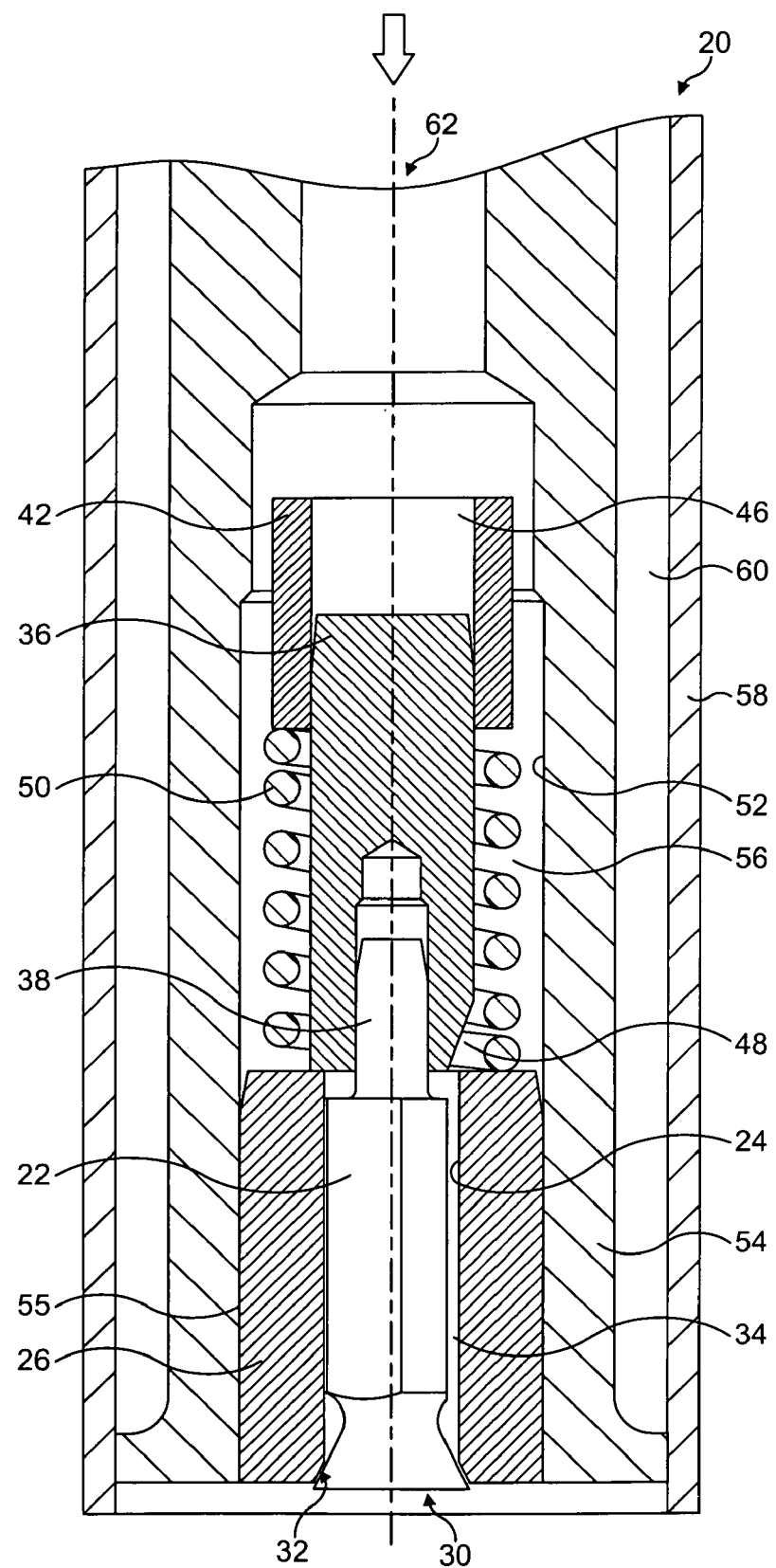
FIG. 3 is a cross-sectional view of the injection device in FIG. 2 when in an open position in which reagent is being injected.

In another alternative embodiment (also not shown) the lift stop feature of the device 20 may be retained, but the stop member 36 in FIGS. 2 and 3 may be integrally formed with the valve member 22 so that the upper end of the valve member (for example, the peg 38) extends directly into the sleeve 42 in an interference fit. In a further alternative embodiment, the sleeve 42 and the stop member 36 may be formed integrally, with the valve member 22 forming an interference fit (i.e. at 40) in the integral part 36, 42.

In another variation, the chamfer(s) 48 on the stop member 36 may be replaced, or provided in combination with, one or more formations provided at the upper end of the valve seat housing 26 to permit reagent to flow past the engaged surfaces 36, 26 as the valve member 22 moves away from the valve seat 32 towards full lift.

The injection device 20 of the invention is convenient to assemble and allows the opening point (pressure) of the device to be adjusted by adjusting the extent to which the spring 50 is compressed between the sleeve 42 and the valve seat housing 26. The maximum extent of movement of the valve member 22 is also adjustable during assembly of the device 20, as will now be described.

Initially, the valve member 22 is inserted into the valve housing bore 24 through the device outlet 30 until the valve member 22 seats against the valve seat 32. A shim (not shown in the Figures) is then introduced over the end of the valve peg 38. The shim is selected to have a thickness, L, which defines the maximum extent of movement of the valve member 22, as described previously. With the shim in place, the stop member 36 is then introduced over the valve peg 38 to form an interference fit 40, until the lower surface of the stop member 36 abuts the upper surface of the shim. The shim is then removed to leave the stop member 36 and the valve member 22 secured together, with a clearance gap L between their facing surfaces.

The spring 50 is received over the stop member 36 to engage its lower end with the upper end of the valve seat housing 26. The upper end of the stop member 36 is then introduced into the sleeve 42 to form an interference fit 44 so that the lower end of the sleeve 42 engages with the upper end of the spring 50. The extent to which the stop member 36 is introduced into the sleeve 42 determines the degree of compression of the spring 50, and hence determines the spring biasing force. The extent to which the stop member 36 is introduced into the sleeve 42 therefore determines the opening pressure of the device (i.e. the point at which the valve member 22 starts to move away from the valve seat 32). The opening point of the device 20 can therefore be adjusted on assembly by varying the extent to which the stop member 36 is received within the sleeve 42.

The sub-assembly of parts 22, 26, 36, 50, 42 is then introduced into the housing part 54 until the lower end of the valve seat housing 26 lies flush with the lower end of the housing part 54. Conveniently, the sub-assembly is press-fitted into the bore 52 of the housing part 54 so as to form the interference fit 55 between the valve seat housing 26 and the housing part 54.

Finally, the housing part 54 is received within the heat shield 58 and the cavity 60 defined therebetween is evacuated to provide the necessary thermal insulation for the device.

A further benefit of the device is that it is relatively compact, so that only a small device area is exposed to the high temperatures of gas within the exhaust chamber 28, this being the lower faces of the housing part 54, the valve seat housing 26 and the valve member 22 which, in the illustration shown in FIG. 2, lie flush with one another. In particular, the compact nature of the device 20 is made possible because of the interference fit construction between (i) the valve seat housing 26 and the housing bore 52 (at 55), (ii) the stop member 36 and the sleeve 42 (at 44), and (iii) the peg 38 and the stop member 36 (at 40). The interference fit 55 between the valve seat housing 26 and the housing part 54 is particularly important as this means the spring 50 can be mounted directly on the upper end of the valve member 22, with no requirement for the spring to be accessible.

The interference fits 55, 40, 44 may be formed by press fitting the parts together as this provides a particularly convenient method of construction without the need for additional parts or machining (e.g. collets, screw threads). As an alternative, or in addition, a glue may be used at any one of the three interfaces (valve seat housing 26/housing bore 52, peg 38/stop member 36, stop member 36/sleeve 42). Welding may also be used as an alternative means of holding the parts together securely.

The compact nature of the construction, and particularly the small size of the valve member, minimises inertia during opening and closing, thereby improving spray quality. This also allows the flow velocity of the injected reagent to be high enough to generate good atomisation, even for the relatively low flow rates required in a reagent dosing system.

The device has particular advantages when employed in a reagent dosing system for an internal combustion engine, such as that illustrated in FIG. 1, but it will be appreciated that the device may be suitable for use in other fluid flow systems and for injecting types of fluid other than a reagent such as urea.

We claim:

1. A reagent dosing system for an internal combustion engine including an exhaust chamber and an injection device to deliver reagent into the exhaust chamber, the injection device comprising:

a device inlet, a device outlet, a sub-assembly comprising (i) a valve housing defining a valve seat, (ii) a valve device movable outwardly from the valve housing, away from the valve seat, to permit the reagent to be delivered into the exhaust chamber through the device outlet, whereby a force is applied to the valve device due to reagent delivered to the device inlet which serves to urge the valve device away from the valve seat, (iii) a stop member which is held securely together with the valve device and is engageable with the valve housing to limit outward movement of the valve device, and (iv) a bias device for applying a biasing force to the valve device which serves to urge the valve device against the valve seat so as to prevent delivery of the reagent through the device outlet into the exhaust chamber, and a device housing separate from the valve housing and having a housing bore within which the valve housing is held securely by means of an interference fit so as to hold the sub-assembly securely within the device housing, wherein the stop member includes a sleeve within which the stop member is held securely and wherein a first end of the bias device abuts a surface of the valve housing and a second end of the bias device abuts a surface of the sleeve.

2. The reagent dosing system as claimed in claim 1, wherein the valve device includes a guide region which forms a clearance fit within the valve housing and serves to guide movement of the valve device, in use.

3. The reagent dosing system as claimed in claim 1, wherein the stop member is held together with the valve member in an interference fit.

4. The reagent dosing system as claimed in claim 1, wherein the stop member defines a first surface and the valve housing defines a second surface, the first and second surfaces together defining a clearance gap (L) which sets the limit of the extent of outward movement of the valve member from the valve housing.

5. The reagent dosing system as claimed in claim 1, wherein the bias device includes a spring component within which at least a portion of the stop member is received.

6. The reagent dosing system as claimed in claim 5, wherein a first end of the spring component abuts a surface of the valve housing and a second end of the spring component abuts a surface of the sleeve so that the extent to which the stop member is received within the sleeve, on assembly of the device, sets the biasing force.

7. The reagent dosing system as claimed in claim 1, wherein at least one of the stop member and the valve housing is shaped to define a flow path for reagent between the device inlet and the valve housing when the valve device is moved away from the valve seat.

8. The reagent dosing system as claimed in claim 1, wherein the device housing includes insulating means to limit heat transfer to the injection device due to exhaust gas in the exhaust chamber.

9. The reagent dosing system as claimed in claim 8, wherein the device housing defines, at least in part, a cavity.

10. The reagent dosing system as claimed in claim 9, wherein the cavity is evacuated.

11. The reagent dosing system as claimed in claim 9, wherein the device housing comprises an inner housing part and an outer housing part which together define the cavity, the sub-assembly being received within the inner housing part.

12. The reagent dosing system as claimed in claim 11, wherein the outer housing part forms an outer sleeve of the device.

\* \* \* \* \*